(12) United States Patent
Uchida et al.

(10) Patent No.: US 10,744,432 B2
(45) Date of Patent: Aug. 18, 2020

(54) FILTER VESSEL ATTACHMENT/DETACHMENT APPARATUS

(71) Applicant: ROKI TECHNO CO., LTD., Tokyo (JP)

(72) Inventors: Tetsuya Uchida, Tokyo (JP); Hirofumi Kawagoe, Tokyo (JP)

(73) Assignee: Roki Techno Co., LTD., Tokyo (JP)

( * ) Notice: Subject to any disclaimer, the term of this patent is extended or adjusted under 35 U.S.C. 154(b) by 3 days.

(21) Appl. No.: 16/079,938

(22) PCT Filed: Feb. 26, 2016

(86) PCT No.: PCT/JP2016/001037
§ 371 (c)(1),
(2) Date: Aug. 24, 2018

(87) PCT Pub. No.: WO2017/145196
PCT Pub. Date: Aug. 31, 2017

(65) Prior Publication Data
US 2019/0054403 A1 Feb. 21, 2019

(51) Int. Cl.
*B01D 35/30* (2006.01)
*B01D 46/00* (2006.01)

(52) U.S. Cl.
CPC ......... *B01D 35/306* (2013.01); *B01D 46/001* (2013.01); *B01D 46/0005* (2013.01); *B01D 46/0012* (2013.01)

(58) Field of Classification Search
CPC .............. B01D 35/306; B01D 46/001; B01D 46/0012; B01D 46/0005

USPC ....... 210/232, 435, 234, 235, 446, 447, 282, 210/445, 236, 238
See application file for complete search history.

(56) References Cited

U.S. PATENT DOCUMENTS

| | | | |
|---|---|---|---|
| 5,397,462 A | 3/1995 | Higashijima et al. | |
| 6,117,320 A * | 9/2000 | Rutz | B29C 48/691 210/232 |
| 6,652,749 B2 | 11/2003 | Stankowski et al. | |
| 7,056,436 B2 | 6/2006 | Stankowski et al. | |

(Continued)

FOREIGN PATENT DOCUMENTS

| | | |
|---|---|---|
| JP | 53-112490 U | 9/1978 |
| JP | 2007-253154 A | 10/2007 |
| JP | 2012-55873 A | 3/2012 |

OTHER PUBLICATIONS

International Preliminary Report on Patentability and Written Opinion issued in PCT/JP2016/001037, dated Aug. 28, 2018.

*Primary Examiner* — Madeline Gonzalez
(74) *Attorney, Agent, or Firm* — BakerHostetler LLP (57) ABSTRACT

The filter vessel attachment/detachment apparatus includes a first conduit end, wherein a first conduit for the fluid to flow through is coupled to the first conduit end, and the first conduit end has a clamping portion capable of clamping the flange of the filter vessel; a contact surface capable of strongly contacting to the inlet or the outlet of the filter vessel; and a guide member capable of, for a direction from the first conduit toward the inlet or the outlet, rotating about a second axis separated from a first axis by a predetermined distance, the first axis being from the first conduit toward the inlet, the guide member having a holding portion capable of holding the inlet or the outlet.

16 Claims, 8 Drawing Sheets

(56) References Cited

U.S. PATENT DOCUMENTS 7,378,017 B2  5/2008  Stankowski et al.
2013/0228509 A1  9/2013  Kuruc

* cited by examiner

FILTER VESSEL ATTACHMENT/DETACHMENT APPARATUS

CROSS-REFERENCE TO RELATED APPLICATION

This application is a U.S. National Stage of International Patent App. PCT/JP2016/001037, filed Feb. 26, 2016, the disclosure of which is incorporated by reference in its entirety.

TECHNICAL FIELD

The invention of the present application relates to, for example, an attachment/detachment system for a filter vessel in which a filter or the like is incorporated.

BACKGROUND

An apparatus for the purpose of filtration of fluid may have a conduit in which a filter vessel incorporating a filter or the like and detachably arranged is used in a portion of the conduit. For example, when a predetermined amount of the filtration has been finished or the like, an old filter vessel is removed to be replaced with a new filter vessel. Such a conduit has a manifold having a missing portion of the conduit between an upstream conduit end and a downstream conduit end. The filter vessel has a structure capable of being detachably attached between this upstream conduit end and the downstream conduit end. The filter vessel has a flow path formed therein, and has a flow path inlet and a flow path outlet at both ends of the flow path. A filter or the like is arranged in the flow path. Generally, the upstream conduit end and the downstream conduit end are configured as portions of the manifold, and when the filter vessel is attached to the manifold, the flow path inlet of the filter vessel is joined with the upstream conduit end, and the flow path outlet is joined with the downstream conduit end. Thereby, the flow path of the filter vessel is coupled to the conduit having the missing portion, and a conduit of a flow circuit system is completed. For example, in PTLs 1 to 3, an example of attaching a detachable filter vessel to a manifold as a holder is described.

Any of PTLs 1 to 3 discloses an example in which a portion of an existing conduit is constituted by a conduit consisting of a filter vessel that can be replaced through attachment/detachment. In PTLs 1 to 3, a distance between one end and another end of a conduit on a side of the manifold is unchanged. In any PTL, the filter vessel has a fluid inlet at which fluid to be filtered flows into the filter vessel, at one end of the filter vessel, and a fluid outlet is arranged at another end of the filter vessel, on a side opposite to the fluid inlet. Then, a direction in which the fluid inlet extends and a direction in which the fluid outlet extends are the same direction.

PTLs 1 and 2 are examples of attaching the filter vessel to the manifold through pivotal motion. In the example of PTL 1, the filter vessel has a structure capable of contraction and extension, in which, in a state where the filter vessel is contracted, a lower conduit end of the filter vessel is fitted into a pivot of the manifold; in the state where the filter vessel is contracted, an upper side of the filter vessel is moved into the manifold through pivotal movement; and the filter vessel is extended so that the conduit of the filter vessel is coupled to the conduit of the manifold so as to be fitted therein. However, when the filter vessel is equipped with a contraction/extension function, the structure of the filter vessel becomes complicated and causes problems of cost for manufacturing the filter vessel and reduction in durability.

In contrast, in the example of PTL 2, the filter vessel does not have the contraction/extension function, the lower conduit end of the filter vessel is a sphere, and the upper side of the filter vessel is moved into the manifold through the pivotal movement with the sphere as the pivot, so that the conduit of the filter vessel is coupled to the conduit of the manifold so as to be fitted therein. However, in such attachment of the filter vessel through the pivotal movement, since a range of motion at an end opposite to the pivot is large, a sliding distance of a seal member is long, and attrition of the seal member is increased to cause a problem of dust emission.

In contrast, PTL 3 discloses an example of configuring the filter vessel to be detachable without use of the pivotal movement. In PTL 3, the filter vessel is mounted between the upstream conduit end and the downstream conduit end of the manifold, through translation movement in a direction perpendicular to a virtual straight line connecting those conduits into the orientation where the direction of the fluid inlet and the fluid outlet of the filter vessel aligns with a direction of the virtual straight line.

CITATION LIST

Patent Literature

PTL 1: U.S. Pat. No. 5,397,462
PTL 2: Japanese Patent Application Laid-Open No. 2007-253154
PTL 3: U.S. Patent Application Publication No. 2013/0228509

SUMMARY OF INVENTION

Technical Problem

In the apparatus for the purpose of the filtration of the fluid, in order to enable the filter vessel to be detachably attached to the manifold, joints of the fluid inlet and outlet of the filter vessel and fluid inlet and outlet of the manifold are required to have high degree of sealing in order to avoid leakage of the fluid. However, as disclosed in PTL 3, in such an attachment/detachment apparatus in which the distance between one end and the other end of the conduit on the manifold side is unchanged, and moreover, the filter vessel is attached through the translation movement, if high degree of adhesion of the joints of the fluid inlet and outlet of the filter vessel and the fluid inlet and outlet of the manifold is secured, friction of the joints of the fluid inlet and outlet of the filter vessel and the fluid inlet and outlet of the manifold becomes large, and attachment/detachment tasks become difficult. Furthermore, due to high friction in the attachment and the detachment, attrition of seal materials is severe and there is a problem of reduced durability. Accordingly, in such an attachment/detachment apparatus in which the distance between one end and the other end of the conduit on the manifold side is unchanged, and moreover, the filter vessel is attached through the translation movement, it is desired to perform easy attachment/detachment while securing the high degree of adhesion.

Solution to Problem

A solution is provided by a filter vessel attachment/detachment apparatus for detachably attaching a filter vessel having a filter inside of the filter vessel, as a part of a filtration apparatus that performs filtration of fluid with the filter, wherein the filter vessel includes, at one end of the filter vessel, one among an inlet or an outlet for the fluid, the one among the inlet or the outlet projecting from the filter vessel and having a flange, the attachment/detachment apparatus including: a first conduit end to which a first conduit is coupled, the fluid being flowable in the first conduit, wherein the first conduit end has a clamping portion capable of clamping the flange of the filter vessel; a contact surface capable of strongly contacting to the one among the inlet or the outlet of the filter vessel; and a guide member having a holding portion capable of holding the one among the inlet or the outlet, the guide member being movable between a first state and a second state in a direction from the first conduit to one among the inlet or the outlet by rotating about a second axis away from a first axis with a predetermined distance to the first axis being from the first conduit to the one among the inlet or the outlet, wherein in the first state, the flange is not clamped by the clamping portion of the first conduit end; in a transition from the first state to the second state, the flange gradually enters the clamping portion of the first conduit end; and in the second state, the flange is clamped by the clamping portion of the first conduit end.

Advantageous Effects of Invention

According to the present invention, in an apparatus that detachably attaches the filter vessel only through the translation movement, the easy attachment/detachment can be realized in a state where the high degree of adhesion is secured.

DETAILED DESCRIPTION

Embodiment 1

Figure 1:
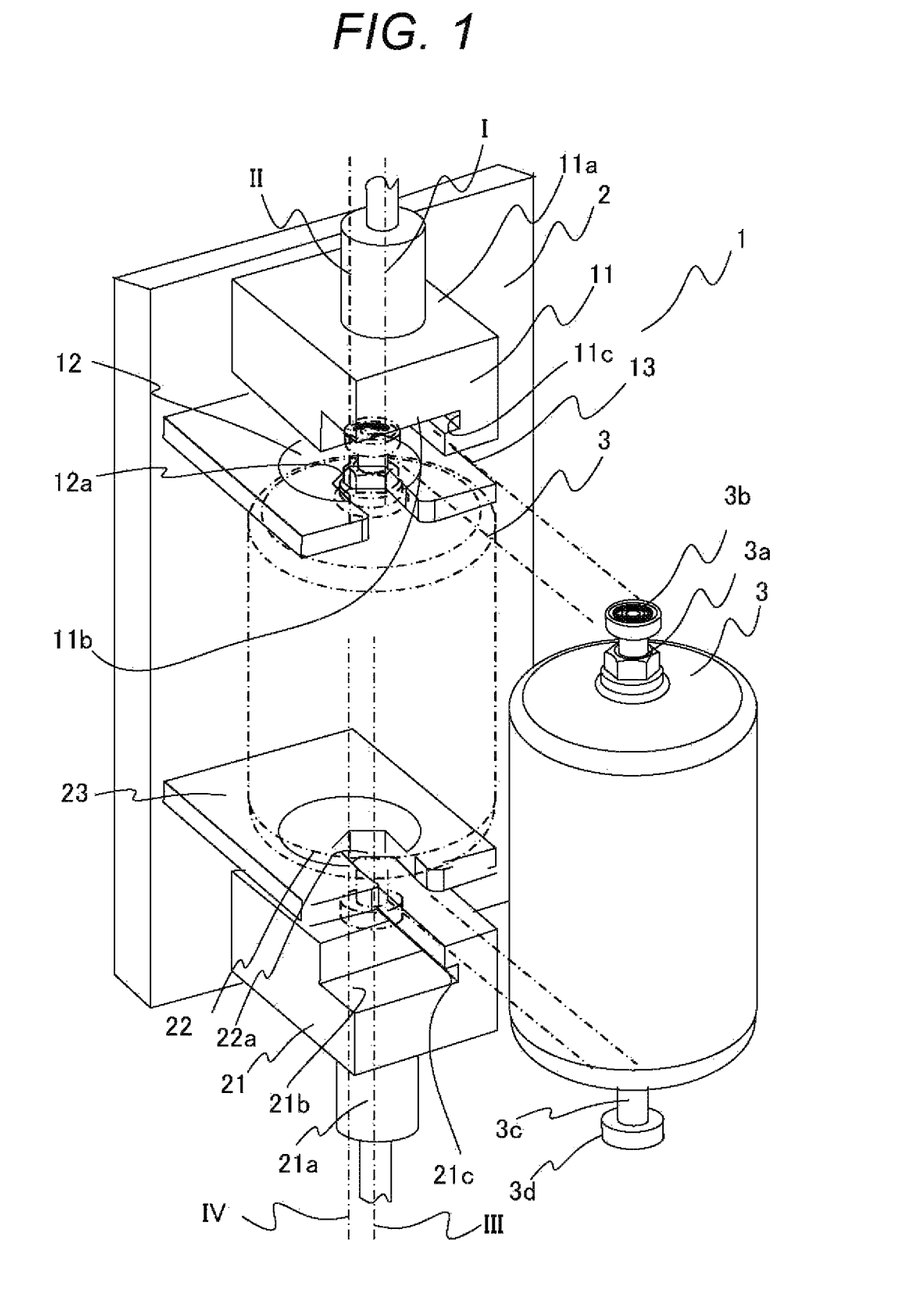
FIG. 1 illustrates a filter vessel and an attachment/detachment apparatus therefor of Embodiment 1 to which the present invention is applied.

The invention of the present application will be described with reference to FIGS. 1 to 6. FIG. 1 illustrates a filter vessel attachment/detachment apparatus 1 in a filtration apparatus used for filtration of fluid in Embodiment 1 of the present invention. The filter vessel attachment/detachment apparatus 1 is attached to a manifold 2, and is an apparatus that performs attachment/detachment of a filter vessel 3. In FIG. 1, a state denoted by a solid line illustrates a state where the filter vessel 3 is separated from the manifold 2. In contrast, a state denoted by a dashed-dot line illustrates a state where the filter vessel 3 is attached to the manifold 2.

The manifold 2 is a part of a flow circuit as the filtration apparatus that performs the filtration of the fluid. The manifold 2 includes a first conduit end 11 and a second conduit end 21. The flow circuit with the manifold 2 attached thereto has a missing portion of a flow path between the first conduit end 11 and the second conduit end 21. The first conduit end 11 and the second conduit end 21 are arranged to face each other in an opposing manner, and each can be, for example, a block-shaped member. For example, to the first conduit end 11, a first conduit 11a connected to a fluid source (not illustrated) can be connected to form an upstream side of the flow circuit, while, to the second conduit end 21, a second conduit 21a connected to a fluid discharge destination (not illustrated) can be connected to form a downstream side of the flow circuit. However, a relationship of the upstream and the downstream at the first conduit 11a and the second conduit 21a is an example, and can also be set inversely.

Figure 2:
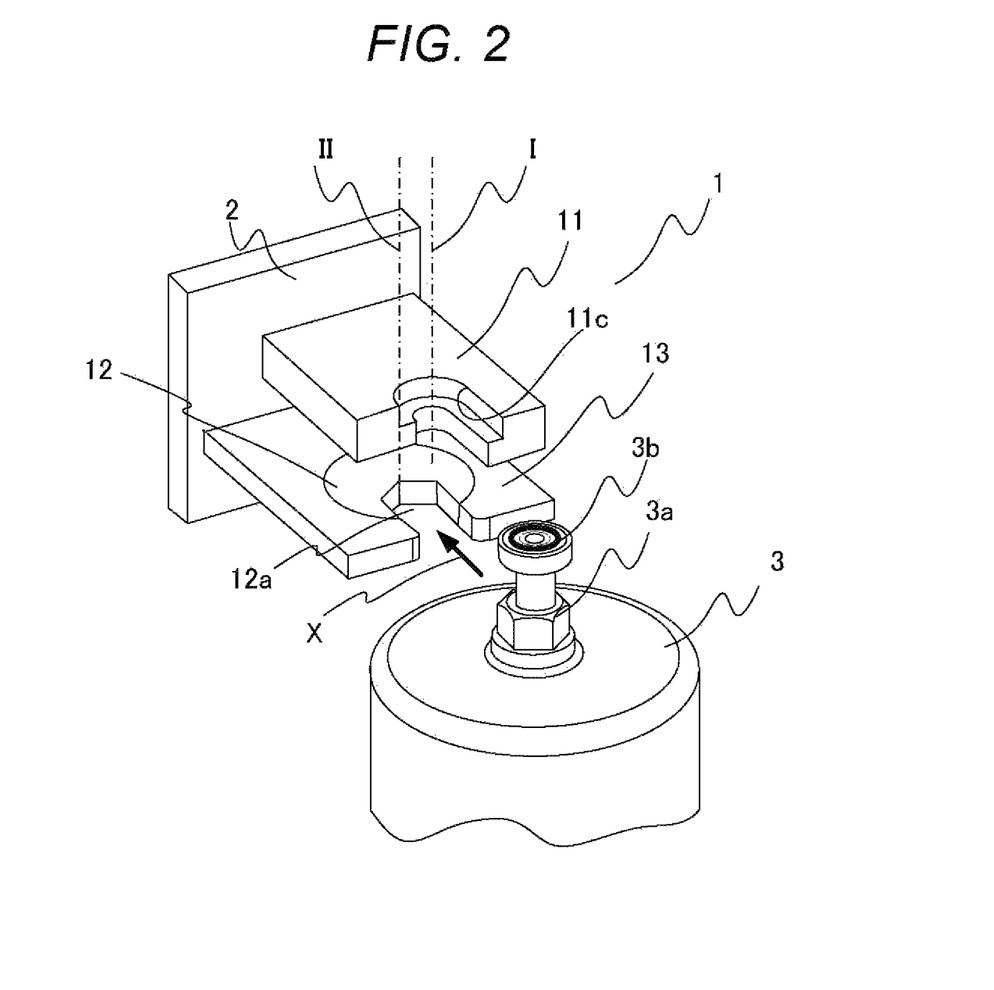
FIG. 2 is an enlarged perspective view of a joint of the filter vessel and a manifold of Embodiment 1 of the present invention, and is a diagram illustrating a state where the filter vessel is separated.
Figure 3:
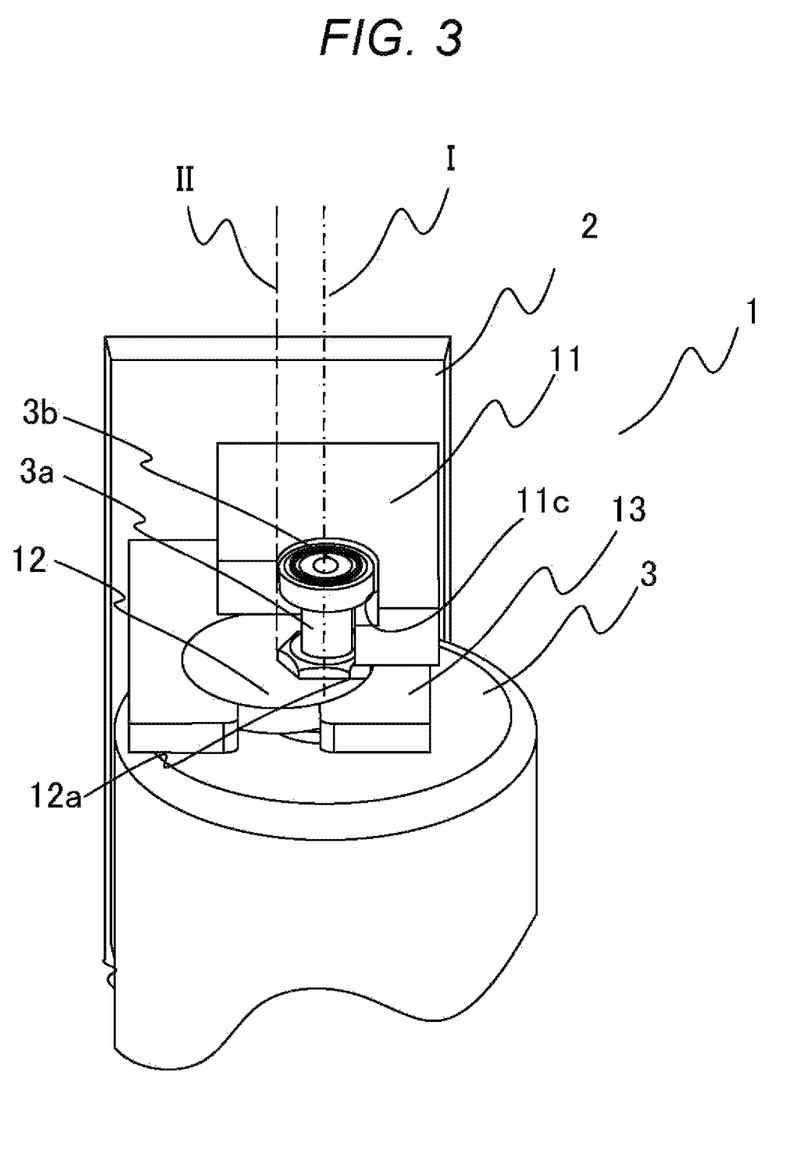
FIG. 3 is an enlarged perspective view of the joint of the filter vessel and the manifold of Embodiment 1 of the present invention, and is a diagram illustrating a state where the filter vessel is completely joined.

FIG. 2 is a diagram illustrating the inside of the first conduit end 11 in a decomposed manner, and is a state where the filter vessel 3 is separated. FIG. 3 is a diagram illustrating the inside of the first conduit end 11 in a decomposed manner, and is a state where the filter vessel 3 is joined. The first conduit end 11 and the second conduit end 21 have a contact surface 11b and a contact surface 21b, respectively. The first conduit end 11 and the second conduit end 21 are fixed, and a distance between the contact surface 11b and the contact surface 21b is unchanged. The filter vessel 3 is detachably attached to be directly fitted in this distance through translation movement from a lateral direction (a nearly orthogonal direction) with respect to a direction from the first conduit end 11 toward the second conduit end 21. Here, "a lateral direction with respect to a direction from the first conduit 11a of the first conduit end 11 toward the second conduit 21a of the second conduit end 21" is defined as "attachment direction X" in the attachment of the filter vessel 3 through the translation movement.

In other words, the manifold 2 constituting a part of a flow circuit system in the present invention is arranged at the missing portion of the flow path that is a part of the flow circuit. Then, between the first conduit end 11 that is one end of the missing portion and the second conduit end 21 that is another end thereof, the flow path within the filter vessel 3 is joined to complete the flow circuit system.

The filter vessel 3 is a capsule-shaped vessel incorporating a filter therein. The filter vessel 3 includes an inlet 3a that extends so as to project from the filter vessel 3 and has a long and thin shape. The filter vessel 3 has a flange 3b at a tip end of the inlet 3a. The filter vessel 3 includes an outlet 3c at an end on a side opposite to a side where the inlet 3a is arranged. The filter vessel 3 has a flange 3d at a tip end of the outlet 3c. The inlet 3a and the outlet 3c are arranged, for example, so as to be in such a shape extending to opposite sides on a straight line. Seal materials are arranged on the flange 3b and the flange 3d, respectively.

The contact surface 11b of the first conduit end 11 and the contact surface 21b of the second conduit end 21 can adhere to the inlet 3a and the outlet 3c of the filter vessel 3 by the respective seal materials of the flange 3b and the flange 3d being squashed. When the contact surface 11b of the first conduit end 11 and the inlet 3a of the filter vessel 3 are strongly contacted, and the contact surface 21b of the second conduit end 21 and the outlet 3c of the filter vessel 3 are strongly contacted, the flow circuit as the filtration apparatus that performs the filtration of the fluid is completed. Here, in a state where the filter vessel 3 is attached to the filter vessel attachment/detachment apparatus 1, when the contact surface 11b of the first conduit end 11 and the inlet 3a of the filter vessel 3 are strongly contacted, one axis (first axis I) can be defined in a direction from the contact surface 11b of the first conduit end 11 toward the inlet 3a of the filter vessel 3. Then, in the state where the filter vessel 3 is attached to the filter vessel attachment/detachment apparatus 1, when the contact surface 21b of the second conduit end 21 and the outlet 3c of the filter vessel 3 are strongly contacted, another axis (third axis III) can be defined in a direction from the contact surface 21b of the second conduit end 21 toward the outlet 3c of the filter vessel 3. The first axis I and the third axis III are axes that preferably extend in the same direction.

The filter vessel attachment/detachment apparatus 1 has a guide member 12 and a guide member holder 13 near the first conduit end 11. The guide member 12 is supported by the guide member holder 13. Moreover, the filter vessel attachment/detachment apparatus 1 has a guide member 22 and a guide member holder 23 near the second conduit end 21. The guide member 22 is supported by the guide member holder 23. The guide member 12 is supported by the guide member holder 13 so as to be rotatable about a second axis II separated from the first axis I by a predetermined distance. The first axis I and the second axis II are axes extending nearly parallel. The guide member 22 is supported by the guide member holder 23 so as to be rotatable about a fourth axis IV separated from the third axis III by a predetermined distance. The third axis III and the fourth axis IV are axes extending nearly parallel.

The guide member 12 and the guide member 22 have a holding portion 12a for holding the inlet 3a of the filter vessel 3, and a holding portion 22a capable of holding the outlet 3c, respectively. For example, a portion having a polygonally-shaped cross-section, for example, such as hexagon, is previously arranged at a portion of the shape of each of the inlet 3a and the outlet 3c of the filter vessel 3. Then, the holding portion 12a and the holding portion 22a can be notches shaped in a manner capable of being fitted therein, respectively. Thereby, the holding portion 12a and the holding portion 22a can be fitted in the inlet 3a and the outlet 3c of the filter vessel 3, respectively. The shapes of the inlet 3a and the outlet 3c of the filter vessel 3 do not necessarily need to be polygonal. The shapes of the holding portion 12a and the holding portion 22a may have a complementary relationship with the shapes of the inlet 3a and the outlet 3c of the filter vessel 3, so that the holding portion 12a and the holding portion 22a can be the notches shaped in a manner capable of being fitted therein. For example, protrusions can be previously provided on the inlet 3a and the outlet 3c of the filter vessel 3, and the holding portion 12a and the holding portion 22a can also be caused to have complementary shapes that receive those protrusions. The shapes can be freely defined as long as each of the holding portion 12a and the holding portion 22a fits in each of the inlet 3a and the outlet 3c of the filter vessel 3, and motion of the filter vessel 3 can be transferred to each of the holding portion 12a and the holding portion 22a.

The first conduit end 11 has a clamping portion 11c having a predetermined width at a place of the contact surface 11b. The second conduit end 21 has a clamping portion 21c having a predetermined width at a place of the contact surface 21b. In the clamping portion 11c and the clamping portion 21c, their predetermined widths correspond to widths of thicknesses of the flange 3b and the flange 3d of the filter vessel 3, respectively, and each of the flange 3b and the flange 3d is clamped between an upper surface and a lower surface that are arranged at each of the clamping portion 11c and the clamping portion 21c. The flange 3b and the flange 3d of the filter vessel 3 are pushed into the clamping portion 11c and the clamping portion 21c to be clamped, respectively. In this state, as illustrated in FIG. 3, the contact surface 11b of the first conduit end 11 and the inlet 3a of the filter vessel 3 are strongly contacted (in a second state), and the contact surface 21b of the second conduit end 21 and the outlet 3c of the filter vessel 3 are strongly contacted (in a fourth state). In contrast, in a state where the flange 3b and the flange 3d of the filter vessel 3 are not pushed into the clamping portion 11c and the clamping portion 21c to be clamped, respectively (in the state of FIG. 2), the contact surface 11b of the first conduit end 11 is in a state of being completely separated or mostly separated from the inlet 3a of the filter vessel 3 (in a first state), and the contact surface 21b of the second conduit end 21 is in a state of being completely separated or mostly separated from the outlet 3c of the filter vessel 3 (in a third state). The guide member 12 has the holding portion 12a holding the inlet 3a, and can rotationally move about the second axis from the first state to the second state. The guide member 22 has the holding portion 22a of the guide member 22 holding the outlet 3c, and can rotationally move about the fourth axis from the third state to the fourth state.

In the first state, the flange 3b is in a state of not being clamped at all or being only partly clamped by the clamping portion 11c of the first conduit end 11. Then, in a transitional stage in which the guide member 12 moves from the first state to the second state, the flange 3b gradually enters the clamping portion 11c of the first conduit end 11. A contact area (adhesion area) of the contact surface 11b of the first conduit end 11 and the inlet 3a of the filter vessel 3 gradually becomes large. Then, since the filter vessel 3 is inserted into the clamping portion 11c of the first conduit end 11 while rotating according to the rotation of the guide member 12, the contact area (adhesion area) of the contact surface 11b of the first conduit end 11 and the inlet 3a of the filter vessel 3 is initially small and gradually becomes large in the insertion, in comparison with a case of the insertion without the rotation. Thus, frictional resistance between the contact surface 11b of the first conduit end 11 and the inlet 3a of the filter vessel 3 is small, and the insertion is easy. In the second state, the flange 3b is completely clamped by the clamping portion 11c of the first conduit end 11, and the contact surface 11b of the first conduit end 11 and the inlet 3a of the filter vessel 3 are strongly contacted. Similarly, in the third state, the flange 3d is in a state of not being clamped, not being clamped at all, or being only partly clamped by the clamping portion 21c of the second conduit end 21. Then, in a transitional stage in which the guide member 22 moves from the third state to the fourth state, the flange 3d gradually enters the clamping portion 21c of the second conduit end 21. A contact area (adhesion area) of the contact surface 21b of the second conduit end 21 and the outlet 3c of the filter vessel 3 gradually becomes large. A mechanism of the transitional stage is similar to the case in the first state and the second state. In the fourth state, the flange 3d is completely clamped by the clamping portion 21c of the second conduit end 21, and the contact surface 21b of the second conduit end 21 and the outlet 3c of the filter vessel 3 are adhered.

Figure 4:
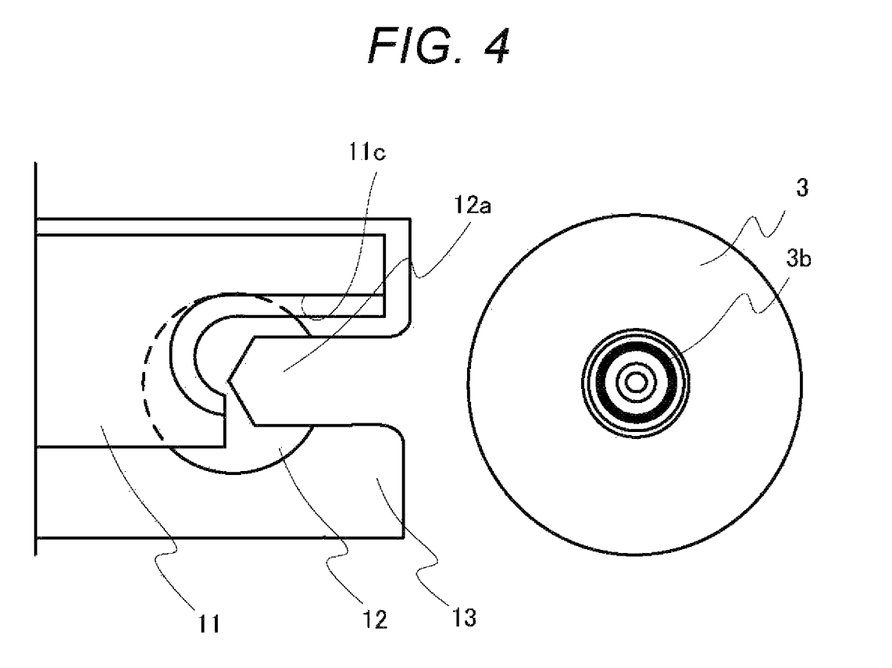
FIG. 4 is a diagram of the joint of the filter vessel and the manifold of Embodiment 1 of the present invention, as viewed from a direction along an axis of a conduit of the filter vessel, and is a diagram illustrating the state where the filter vessel is separated.
Figure 5:
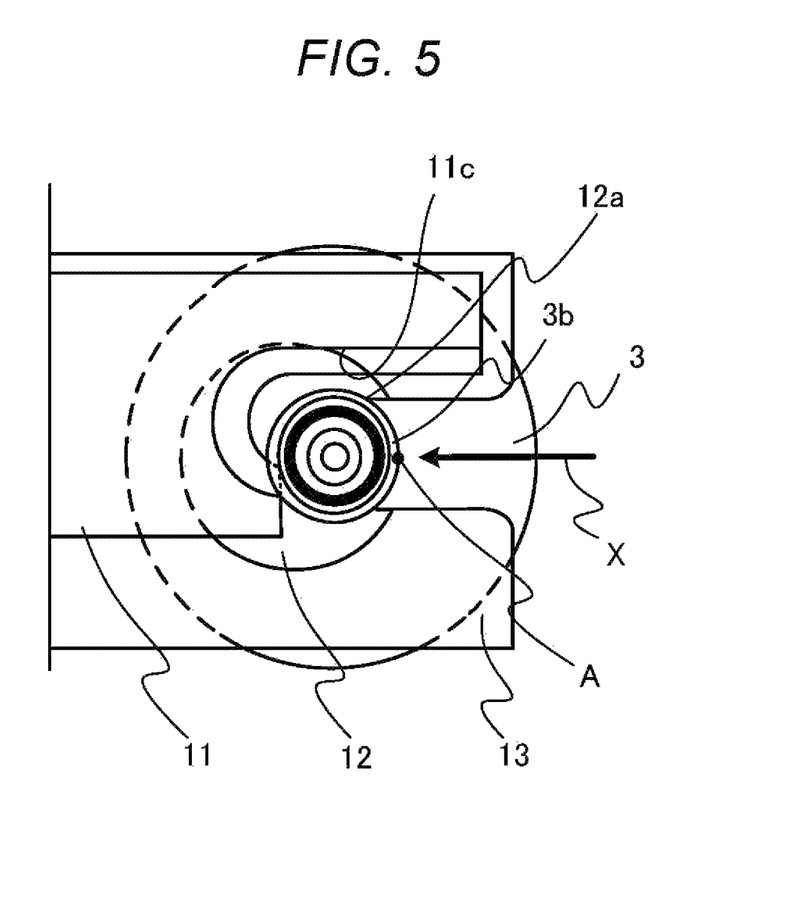
FIG. 5 is a diagram of the joint of the filter vessel and the manifold of Embodiment 1 of the present invention, as viewed from the direction along the axis of the conduit of the filter vessel, and is a diagram illustrating a state in an intermediate stage of attachment of the filter vessel.
Figure 6:
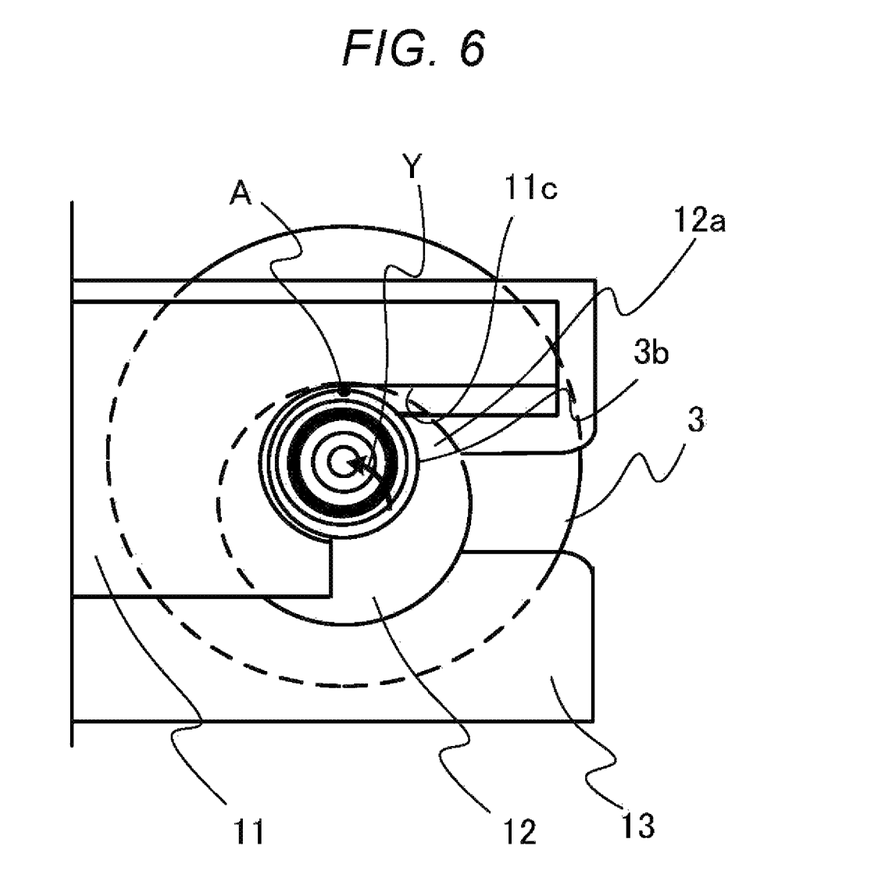
FIG. 6 is a diagram of the joint of the filter vessel and the manifold of Embodiment 1 of the present invention, as viewed from the direction along the axis of the conduit of the filter vessel, and is a diagram illustrating the state where the filter vessel is completely joined.

FIGS. 4 to 6 are diagrams illustrating a relationship of positions of the inlet 3a of the filter vessel 3 and the guide member 12. As illustrated in FIG. 4, first, in an initial stage, the filter vessel 3 is separated from the guide member 12. When the filter vessel 3 is attached to the filter vessel attachment/detachment apparatus 1, as illustrated in FIG. 5, the filter vessel 3 is moved in the attachment direction X, and first, the inlet 3a of the filter vessel 3 is fitted in the holding portion 12a of the guide member 12 (in the first state). Here, the filter vessel 3 performs translation motion with respect to the filter vessel attachment/detachment apparatus. After the inlet 3a of the filter vessel 3 is fitted in the holding portion 12a of the guide member 12, the rotation of the filter vessel 3 about the second axis II (rotation in a fixed direction Y) is performed according to the guide member 12. Thereby, the guide member 12 moves from the first state to the second state. With the rotation, the flange 3b gradually enters the clamping portion 11c of the first conduit end 11. Then, while the filter vessel 3 rotates about the second axis II, since the first axis I is separated from the second axis II by the predetermined distance, it means that the flange 3b is also rotating about the first axis I with respect to the first axis I. As described in a case of FIGS. 5 and 6, the filter vessel 3 rotates 90 degrees about the second axis II from the first state to the second state. Then, as seen for the first axis I, it provides an effect of the rotation that is also performed about the first axis I. In other words, for one arbitrary point of the flange 3b (a point A in FIG. 5) in the first state, in the flange 3b in the second state, the arbitrary point (the point A in FIG. 6) is in a state of having rotated 90 degrees also about the second axis II with respect to the first state, while the arbitrary point is put in a state of having rotated 90 degrees also about the first axis I. According to the both rotations, the frictional resistance between the contact surface 11b of the first conduit end 11 and the inlet 3a of the filter vessel 3 can be reduced. Eventually, the flange 3b is put into the second state (FIG. 6) of being completely clamped by the clamping portion 11c of the first conduit end 11. The same applies to operation between the third state and the fourth state.

In this way, with rotation motions of the guide member 12 and the guide member 22, the contact surface 11b of the first conduit end 11 and the inlet 3a of the filter vessel 3 are moved so as to be strongly contacted, the contact surface 21b of the second conduit end 21 and the outlet 3c of the filter vessel 3 are moved so as to be strongly contacted, and thereby, the frictional resistance is reduced while the degree of adhesion is maintained, which thereby enables easier attachment/detachment of the filter vessel than the case of the translation movement.

Embodiment 2

Figure 7:
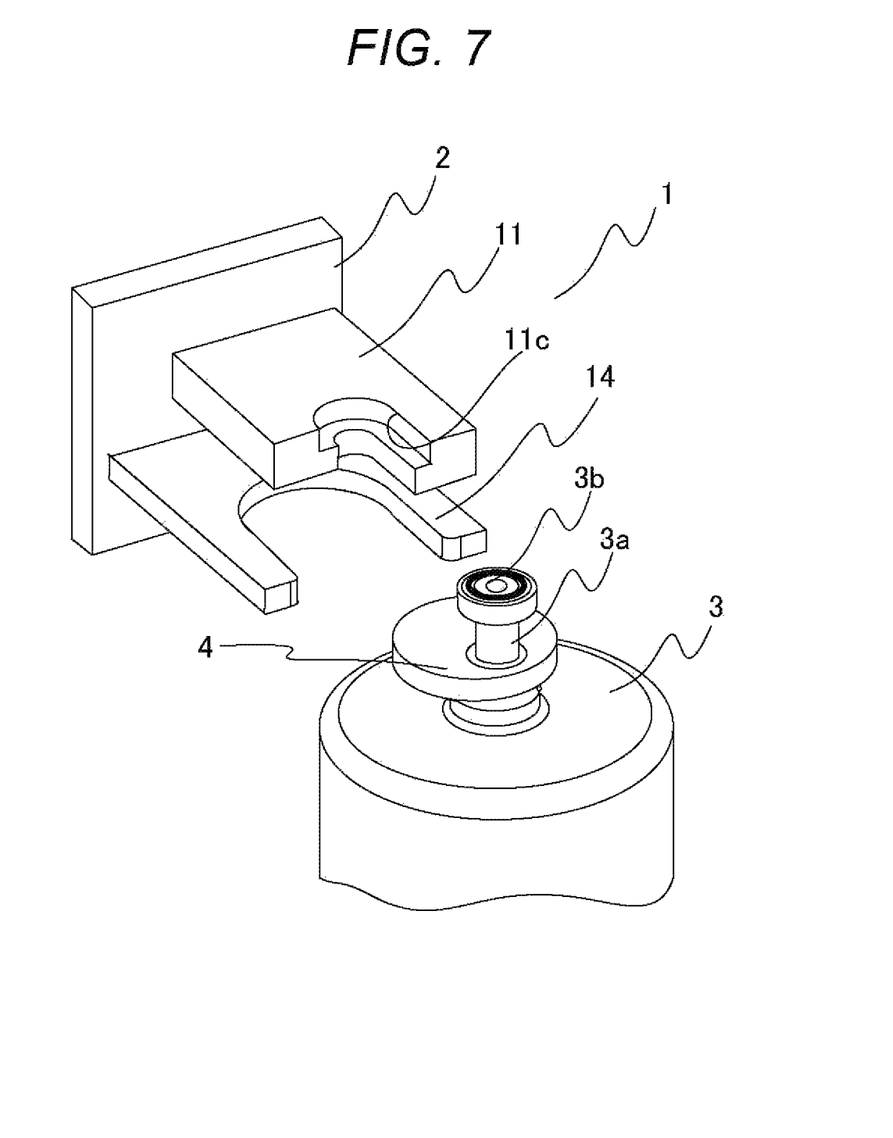
FIG. 7 is an enlarged perspective view of the joint of the filter vessel and the manifold of Embodiment 2 of the present invention, and is a diagram illustrating the state where the filter vessel is separated.
Figure 8:
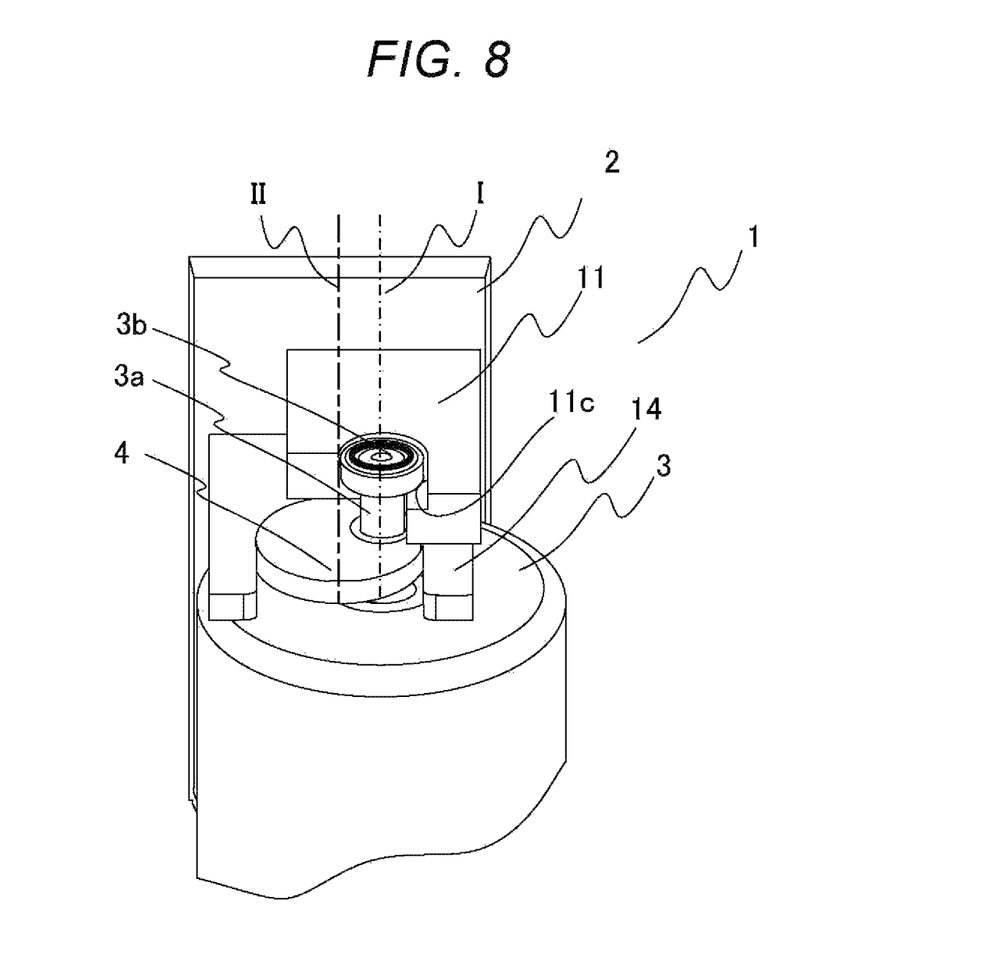
FIG. 8 is an enlarged perspective view of the joint of the filter vessel and the manifold of Embodiment 2 of the present invention, and is a diagram illustrating a state where the filter vessel is joined.

In Embodiment 1, the example has been described in which the guide member 12 and the guide member 22 are attached to a side of the manifold 2. However, as illustrated in FIGS. 7 and 8, the filter vessel 3 may be arranged to have rotating members. FIGS. 7 and 8 are diagrams corresponding to FIGS. 2 and 3 in Embodiment 1, and illustrate only one end of the filter vessel 3 and omit another end of the filter vessel 3. However, the same applies to a side of the other end. In the case of Embodiment 2, a guide plate 4 is arranged at the inlet 3a of the filter vessel 3. The guide plate 4 is rotatably held about the second axis II by a guide member holder 14, similarly to the guide member 12 capable of rotating about the second axis II in Embodiment 1. Embodiment 2 is similar to Embodiment 1 except that the guide plate 4 is fixed to the filter vessel 3.

REFERENCE SIGNS LIST 1 filter vessel attachment/detachment apparatus
2 manifold
3 filter vessel
11 first conduit end
12 22 guide members
21 second conduit end

The invention claimed is:

1. A filter vessel attachment/detachment apparatus for detachably attaching a filter vessel having a filter inside of the filter vessel, as a part of a filtration apparatus that performs filtration of fluid with the filter, wherein the filter vessel includes, at one end of the filter vessel, a first pipe configured to function as an inlet or an outlet for the fluid, the first pipe having one end extending from the filter vessel in an extending direction and having a flange at another end of the first pipe, a surface of the flange being perpendicular to the extending direction, the filter vessel attachment/detachment apparatus comprising:
   a first conduit end to which a first conduit in which the fluid is flowable is coupled, the first conduit end having a clamping portion formed by a first contact surface and a second contact surface opposing the first contact surface, the first contact surface having a conduit opening of the first conduit; and
   a guide member having a holding portion configured to hold the first pipe, the guide member being rotatable around a second axis between a first state in which the first pipe of the filter vessel is not fluidly connected with the conduit opening and a second state in which the first pipe of the filter vessel is fluidly connected with the conduit opening, the second axis being spaced by a predetermined distance and parallel to a first axis, the first axis extending in a direction perpendicular to the first contact surface at the conduit opening,
   wherein in the first state, the first pipe is held by the holding portion and the flange is not clamped by the clamping portion,
   wherein in a transition from the first state to the second state, the guide member rotates around the second axis and the flange enters in between the first contact surface and the second contact surface of the clamping portion of the first conduit end, and
   wherein in the second state, the flange completely enters in between the first contact surface and the second contact surface of the clamping portion such that the flange is clamped by the clamping portion of the first conduit end.

2. The filter vessel attachment/detachment apparatus according to claim 1,
   wherein the filter vessel includes a second pipe configured to function as the other of the inlet and the outlet for the fluid at another end on a side opposite to the one end of the filter vessel, the second pipe having one end extending from the filter vessel on a side opposite to a side on which the first pipe is provided in the extending direction and having another flange at another end of the second pipe, a surface of the another flange being perpendicular to the extending direction, the filter vessel attachment/detachment apparatus further comprising:

a second conduit end to which a second conduit in which the fluid is flowable is coupled, the second conduit end having another clamping portion formed by a third contact surface and a fourth contact surface opposing the third contact surface, the third contact surface having a conduit opening of the second conduit; and another guide member having another holding portion configured to hold the second pipe, the another guide member being rotatable around the second axis between the first state and the second state, wherein in the first state, the second pipe is held by the another holding portion of the another guide member and the another flange is not clamped by the another clamping portion, wherein in the transition from the first state to the second state, the another guide member rotates around the second axis and the another flange enters in between the third contact surface and the fourth contact surface of the another clamping portion of the second conduit end, and wherein in the second state, the another flange completely enters in between the third contact surface and the fourth contact surface of the another clamping portion such that the another flange is clamped by the another clamping portion of the second conduit end.

3. The filter vessel attachment/detachment apparatus according to claim 2, wherein a distance between the third contact surface and the fourth contact surface is a thickness of the another flange of the filter vessel.

4. The filter vessel attachment/detachment apparatus according to claim 2, wherein the another holding portion of the another guide member includes a notch configured to receive the second pipe of the filter vessel.

5. The filter vessel attachment/detachment apparatus according to claim 2, wherein the fourth contact surface has a notch configured to receive the second pipe in the second state.

6. The filter vessel attachment/detachment apparatus according to claim 1, wherein a distance between the first contact surface and the second contact surface is a thickness of the flange of the filter vessel.

7. The filter vessel attachment/detachment apparatus according to claim 1, wherein the holding portion of the guide member includes a notch configured to receive the first pipe of the filter vessel.

8. The filter vessel attachment/detachment apparatus according to claim 1, wherein the second contact surface has a notch configured to receive the first pipe in the second state.

9. A filter vessel attachment/detachment apparatus for detachably attaching a filter vessel having a filter inside of the filter vessel, as a part of a filtration apparatus that performs filtration of fluid with the filter, wherein the filter vessel includes, at one end of the filter vessel, a first pipe configured to function as an inlet or an outlet for the fluid, the first pipe having one end extending from the filter vessel in an extending direction and having a flange at another end of the first pipe, a surface of the flange being perpendicular to the extending direction and a guide plate, the filter vessel attachment/detachment apparatus comprising:

a first conduit end to which a first conduit in which the fluid is flowable is coupled, the first conduit end having a clamping portion formed by a first contact surface and a second contact surface opposing the first contact surface, the first contact surface having an conduit opening of the first conduit; and a guide plate holder for rotatably supporting the guide plate so that the guide plate is rotatable around a second axis between a first state in which the first pipe of the filter vessel is not fluidly connected with the conduit opening and a second state in which the first pipe of the filter vessel is fluidly connected with the conduit opening, the second axis being spaced by a predetermined distance and parallel to a first axis, the first axis extending in a direction perpendicular to the first contact surface at the conduit opening, wherein in the first state, the guide plate is held by the guide plate holder and the flange is not clamped by the clamping portion, wherein in a transition from the first state to the second state, the guide plate rotates in the guide plate holder around the second axis and the flange enters in between the first contact surface and the second contact surface of the clamping portion of the first conduit end, and wherein in the second state, the flange completely enters in between the first contact surface and the second contact surface of the clamping portion such that the flange is clamped by the clamping portion of the first conduit end.

10. The filter vessel attachment/detachment apparatus according to claim 9, wherein the filter vessel includes a second pipe configured to function as the other of the inlet and the outlet for the fluid at another end on a side opposite to the one end of the filter vessel, the second pipe having one end extending from the filter vessel on a side opposite to a side on which the first pipe is provided in the extending direction and having another flange at another end of the second pipe, a surface of the another flange being perpendicular to the extending direction, and another guide plate, the filter vessel attachment/detachment apparatus further comprising:

a second conduit end to which a second conduit in which the fluid is flowable is coupled, the second conduit end having another clamping portion formed by a third contact surface and a fourth contact surface opposing the third contact surface, the third contact surface having an conduit opening of the second conduit; and another guide plate holder for rotatably supporting the another guide plate so that the another guide plate is rotatable around the second axis between the first state and the second state, wherein in the first state, the another guide plate is held by the another guide plate holder and the another flange is not clamped by the another clamping portion, wherein in the transition from the first state to the second state, the another guide plate rotates in the another guide plate holder around the second axis and the another flange enters in between the third contact surface and the fourth contact surface of the another clamping portion of the second conduit end, and wherein in the second state, the another flange completely enters in between the third contact surface and the fourth contact surface of the another clamping portion such that the another flange is clamped by the another clamping portion of the second conduit end.

11. The filter vessel attachment/detachment apparatus according to claim 10, wherein a distance between the third contact surface and the fourth contact surface is a thickness of the another flange of the filter vessel.

12. The filter vessel attachment/detachment apparatus according to claim 10, wherein the another guide plate holder includes a notch configured to receive the another guide plate of the filter vessel.

13. The filter vessel attachment/detachment apparatus according to claim 10, wherein the fourth contact surface has a notch configured to receive the second pipe in the second state.

14. The filter vessel attachment/detachment apparatus according to claim 9, wherein a distance between the first contact surface and the second contact surface is a thickness of the flange of the filter vessel.

15. The filter vessel attachment/detachment apparatus according to claim 9, wherein the guide plate holder includes a notch configured to receive the guide plate of the filter vessel.

16. The filter vessel attachment/detachment apparatus according to claim 9, wherein the second contact surface has a notch configured to receive the first pipe in the second state.

* * * * *